(12) United States Patent
Neumann

(10) Patent No.: US 8,985,922 B2
(45) Date of Patent: Mar. 24, 2015

(54) E-TRACK CONNECTOR

(71) Applicant: Snap-Loc Cargo Control Systems, LLC, Las Vegas, NV (US)

(72) Inventor: Timothy Neumann, Las Vegas, NV (US)

(73) Assignee: Snap-Loc Cargo Control Systems, LLC, Las Vegas, NV (US)

( * ) Notice: Subject to any disclaimer, the term of this patent is extended or adjusted under 35 U.S.C. 154(b) by 0 days.

(21) Appl. No.: 13/789,420

(22) Filed: Mar. 7, 2013

(65) Prior Publication Data

US 2013/0251474 A1    Sep. 26, 2013

Related U.S. Application Data

(63) Continuation-in-part of application No. 12/427,841, filed on Apr. 22, 2009, now abandoned, which is a continuation-in-part of application No. 11/544,212, filed on Oct. 6, 2006, now abandoned.

(51) Int. Cl.
*B60P 7/08* (2006.01)
*B60R 7/02* (2006.01)

(52) U.S. Cl.
CPC *B60P 7/0807* (2013.01); *B60R 7/02* (2013.01)
USPC ............................................. 410/106; 410/97

(58) Field of Classification Search
CPC ...... B60P 3/079; B60P 7/0807; B60P 7/0815; B60P 7/0823; B61D 45/001
USPC ........... 410/97, 100, 106, 110, 112, 113, 116; 24/115 K, 265 CD; 248/499
See application file for complete search history.

(56) References Cited

U.S. PATENT DOCUMENTS

| 5,730,346 | A  | * | 3/1998 | Adams et al. |
| 6,675,980 | B2 | * | 1/2004 | Ehrgott |
| 7,438,510 | B1 | * | 10/2008 | Ledford ............................ 410/3 |
| 8,439,612 | B2 | * | 5/2013 | Chamoun ..................... 410/121 |

* cited by examiner

*Primary Examiner* — Stephen Gordon
(74) *Attorney, Agent, or Firm* — The Eclipse Group LLP

(57) ABSTRACT

An improved e-track connector, or lockdown, is presented that can be installed in single locations instead of provided in tracks as in the industry. It also possesses a finished slot that accepts logistics straps buckles. The slot is a complete rectangle with no excess material folded under it and has been deburred and finished smooth. The device also possesses a drain slot along the side of the tang and drain holes in the buckle receiver such that liquid will drain out of the connector when it is mounted horizontally.

4 Claims, 6 Drawing Sheets

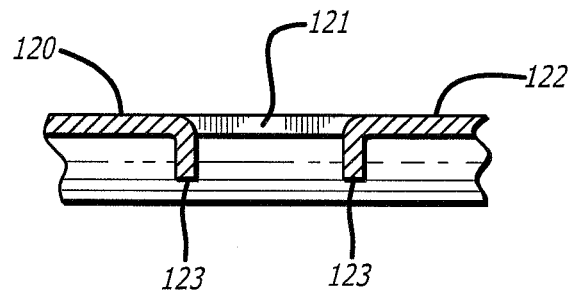
FIG. 8C
Prior Art
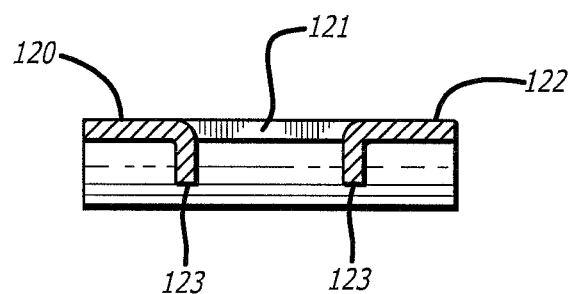
FIG. 8D
Prior Art
FIG. 9
Prior Art
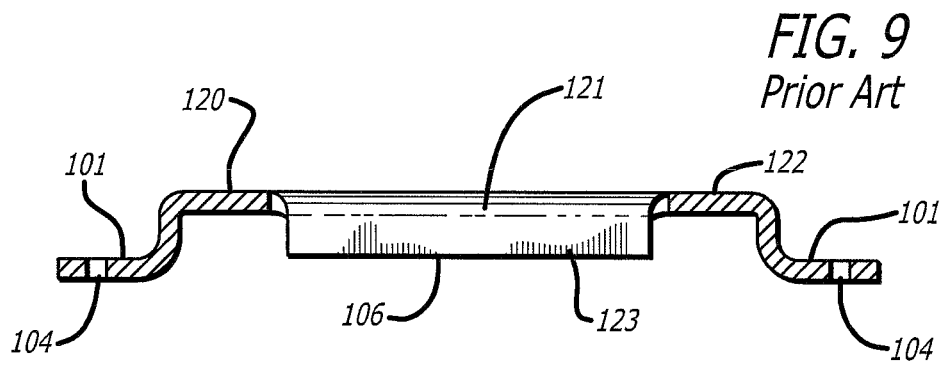

E-TRACK CONNECTOR

CROSS-REFERENCE TO RELATED APPLICATIONS

This application is a continuation-in-part of an claims priority to U.S. application Ser. No. 12/427,841, filed Apr. 22, 2009, titled IMPROVED E-TRACK CONNECTOR, now abandoned; which is a continuation-in-part of and claims priority to U.S. patent application Ser. No. 11/544,212, filed on May 4, 2009, now abandoned, both applications which are incorporated by reference in this application in their entirety.

BACKGROUND OF THE INVENTION

Field of the Invention

The present invention relates to devices developed to secure logistics straps to load beds, dollies, or other cargo areas.

This invention relates to the fittings used in the transportation industry to secure flexible belts to load rails mounted on the sides of the containers. The canvas logistics straps are used for holding the objects in partially loaded containers so they will not shift within the container and damage the goods by either striking the sides of the containers or other items within the container. The load rails are mounted is such containers as trucks, railroad cars, airplanes and ship containers.

The load rails are comprised of sequences of lock-down points. These points are fitted with connectors referred to as "e-track" connectors. The e-track connectors accept an industry standard buckle on the end of the straps used to secure cargos. The straps are wrapped over and around cargo items and then buckled to the e-track connectors. The straps can then be tightened with attached winches.

FIGS. 8A-D and FIG. 9 illustrate an industry standard, prior art, e-track connector is an industry-standard metal device that is shaped and cut to accept the buckle end of a standard logistics strap. The standard e-track connector is made of steel and is created by forming a steel plate into a raised structure and then punching a rectangular hole through the top such that the edges of the punched hole are forced inward. The connector is usually made in "tracks," as illustrated in FIG. 8A, consisting of a plurality of connectors formed from a single sheet of metal. The connector may also be a single connector as illustrated in FIG. 8B. The metal leaves a relatively thin rectangular hole with straight edges along the ends. The thin rectangular hole accepts the buckle of a logistics strap. In both the single e-track and track e-track type connectors, the sides are open and expose the edges resulting from the punched hole.

The hole is essentially unfinished and possesses metal burrs and irregularities, as well as folded metal extending into the humped structure along the long ends of the rectangle. The industry-standard e-track connector is inexpensive to manufacture because it is unfinished and untrimmed.

SUMMARY

This present invention consists of individually-manufactured and mounted e-track connectors that have been deburred and finished to remove sharp metal edges. The invention is a single connector with a plurality of connection means for securing it to the side of a container, such as an aircraft interior or truck bed. This individual connector, when attached to the side of a container, is stronger in terms of its holding capacity and easier to place in the container.

The e-track connector of this invention is bolted, glued, or welded onto a floor or other surface where a logistics strap can be secured. The invention possesses a technological improvement consisting of two drainage ports, a slot on the side of the connector and a pair of holes on the buckle receiver that permit fluid to drain from within the invention at any orientation.

The e-track connector of the invention is further a closed track connector in that the e-track connector includes four side walls effectively enclosing the area where the buckle is received. The current invention provides an inexpensive single placement e-track connector that is trimmed and deburred, thereby improving user safety. The design of the present invention allows for the e-track connector to be self-draining, permitting water and other liquids to drain out of the enclosure.

The present invention can be constructed from a variety of metals, including mild and stainless steel, brass, aluminum and lighter metals to address multiple applications. By manufacturing the track as a single unit, users are permitted to place a single unit where a traditional e-track will not fit.

BRIEF DESCRIPTION OF THE FIGURES

FIG. 8C (Prior Art) is a side view of a cross-section of the e-track connector of FIG. 8A taken along line 8C.

FIG. 8D (Prior Art) is a side view of a cross-section of the e-track connector of FIG. 8B taken along line 8D.

FIG. 9 (Prior Art) is a side view of a cross-section of the standard e-track connector of FIGS. 8A and 8B taken along line 9 of each respective figure.

DETAILED DESCRIPTION

Figure 1:
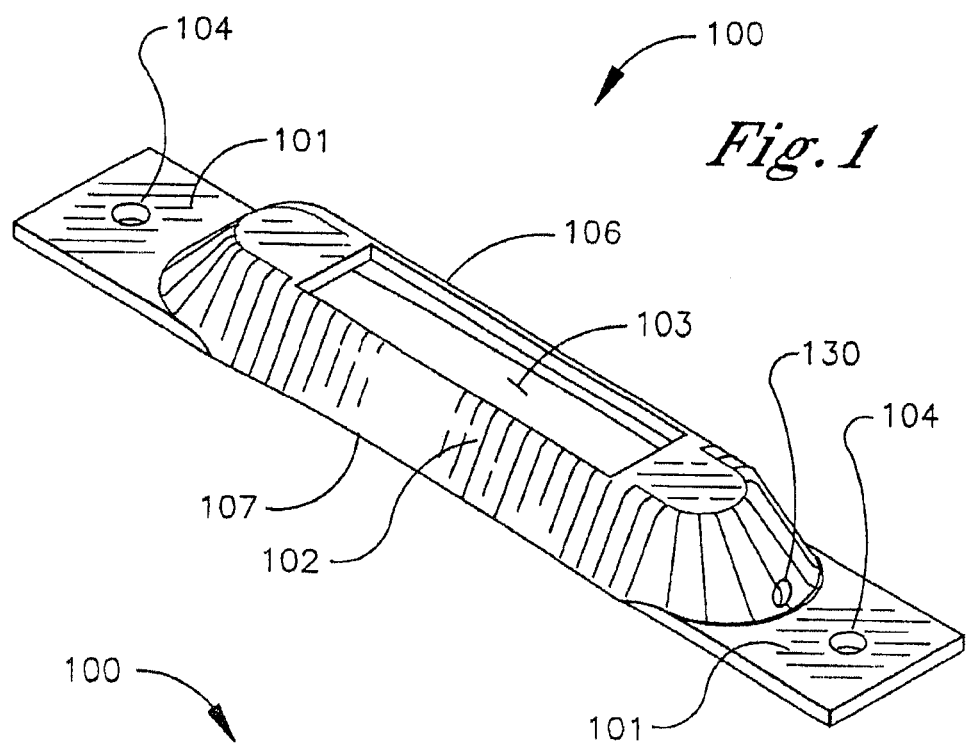
FIG. 1 is a perspective view of the invention with connector holes.
Figure 2:
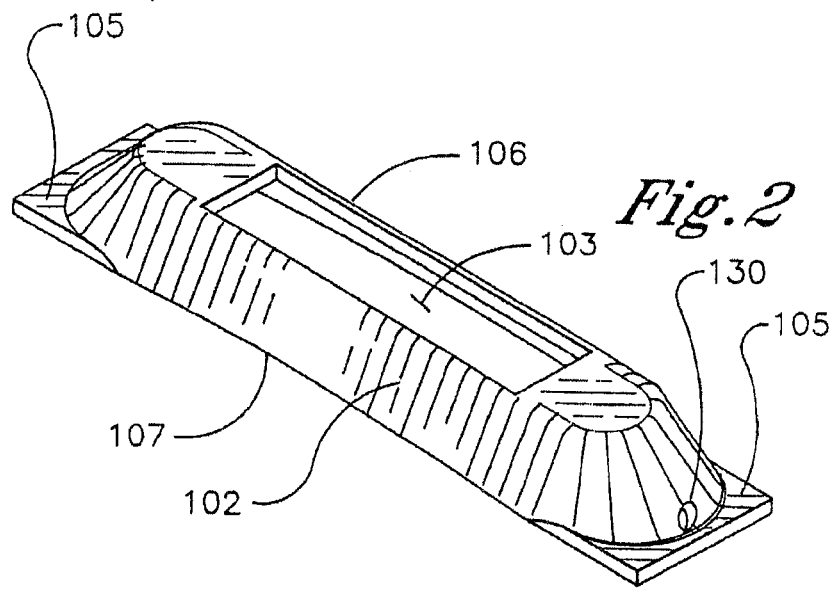
FIG. 2 is a perspective view of the invention suitable for welding.

As shown in FIG. 1, the invention 100 consists of a flat piece of metal pressed into a characteristic shape consisting of a tang 101, a buckle receiver 102, a buckle receiver slot 103, and two connector holes 104. In FIG. 2, an alternative embodiment possesses a smaller welding tang 105 and no connector holes. The alternate embodiment would be attached to a surface by welding or gluing.

Figure 3:
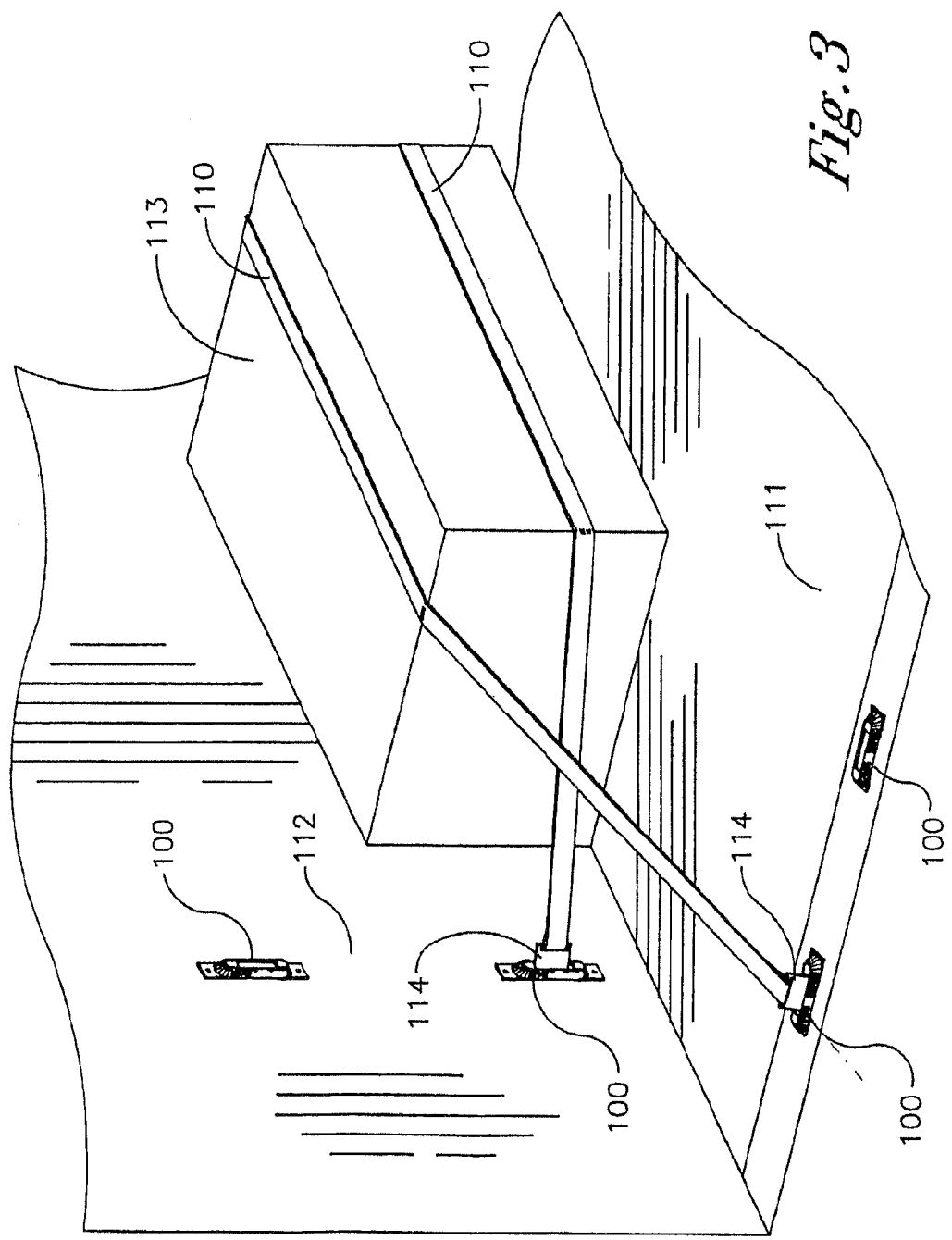
FIG. 3 is a depiction of the invention used to secure logistics straps.
Figure 4:
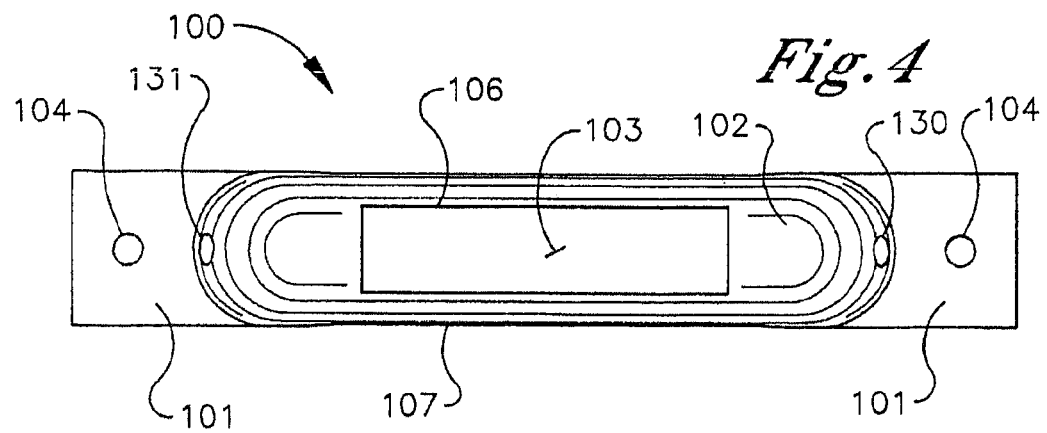
FIG. 4 is a top view of the invention.
Figure 5:
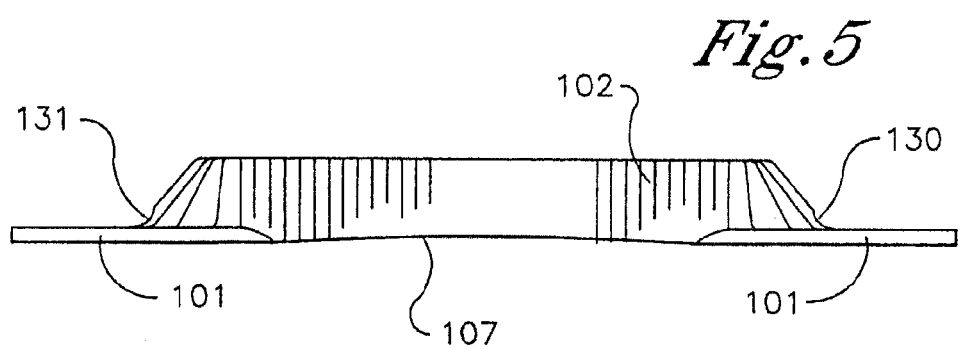
FIG. 5 is a side view of the invention.
Figure 6:
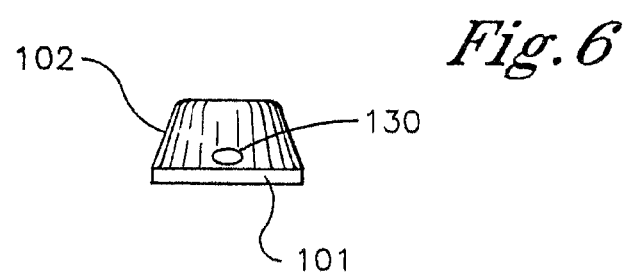
FIG. 6 is an end view of the invention.
Figure 7:
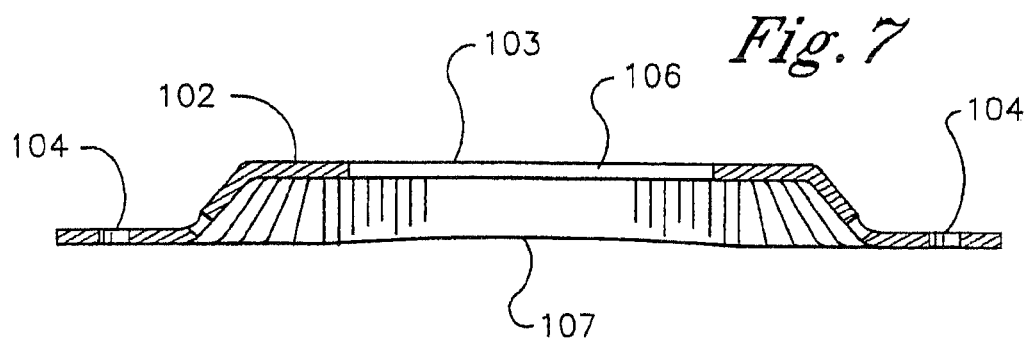
FIG. 7 is a cross-section view of the invention.

FIG. 3 shows the invention 100 bolted to the floor 111 and walls 112 of a storage area, with logistics straps 110 restraining a box 113. Each logistics strap 110 possesses a buckle 114 at each end that can be inserted into the buckle receiver slot 103 of the invention 100 and firmly connected.

Each embodiment of the invention possesses characteristic drain features, including a drain gap 107 on each side of the device which is approximately 1/32 of an inch in width when the invention 100 is bolted or welded down to a flat surface, and two drain holes 130,131. The drain gap 107 is sufficiently wide to allow water or other liquids to flow out of the buckle receiver 102 when the invention is placed horizontally on a surface and water cannot flow out of the buckle receiver slot 103. The drain holes 130,131 allow water to drain out of the buckle receiver 102 when the invention is installed in a vertical orientation.

Figure 8A:
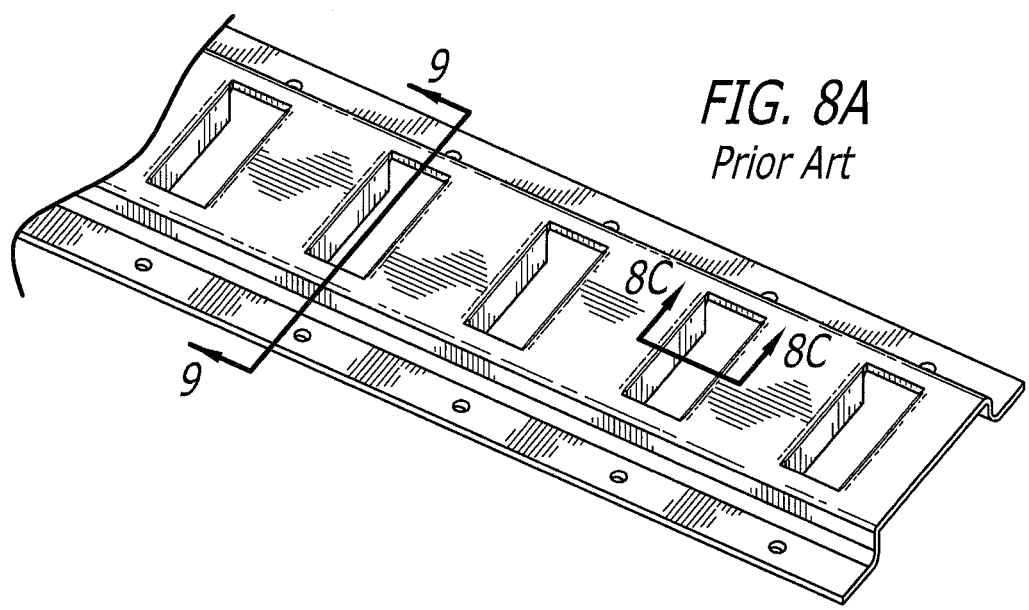
FIG. 8A (Prior Art) is a perspective view of a prior art industry standard e-track connector.
Figure 8B:
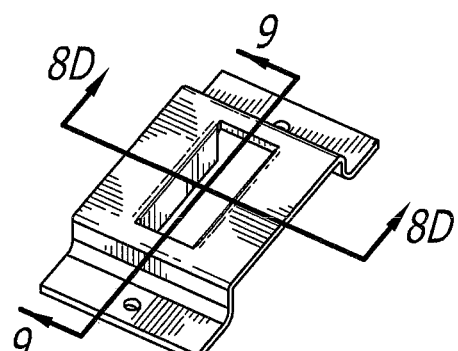
FIG. 8B (Prior Art) is a perspective view of a prior art industry standard single e-track connector.

As shown in FIG. 8, the industry-standard e-track connector 120 is manufactured by punching a slot 121 into the buckle receiver 122 like punching a hold in a can with a can opener. This process leaves folded-over metal remnants 123 lining the long side of the buckle receiver slot 121. The buckle receiver slot 121 is not finished and the edges are sharp and rough.

With the present invention, the long edges 106 of the buckle receiver slot 103 are trimmed of the excess metal and deburred. This makes a connector that is likely to cut human hands or other equipment that come into contact with the buckle receiver slot 103.

Figure 10:
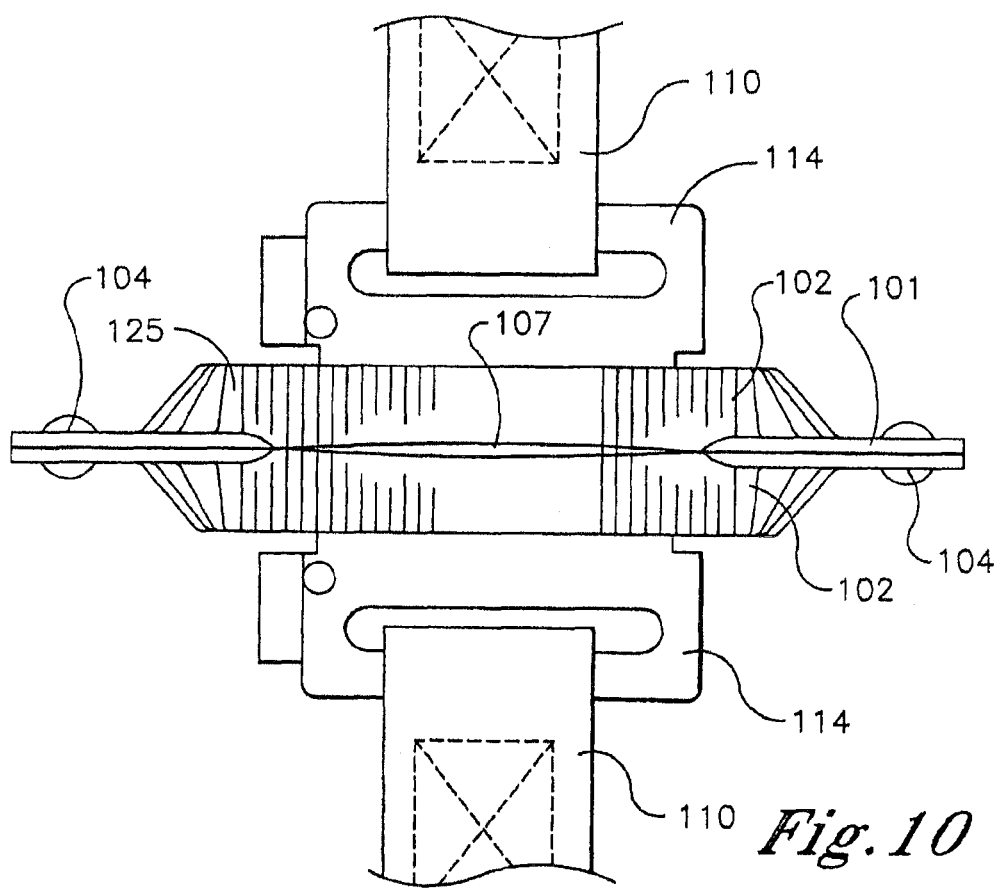
FIG. 10 is a cross-section of two copies of invention attached back-to-back.

As in FIG. 10, in a further alternate embodiment, two of the inventions 100 can be welded or bolted "back-to-back" 125, with the tangs 101 contacting each other. This embodiment permits logistics straps 110 to be extended by providing a "double-female" connector that accepts the "male" buckles of two straps.

This invention has other applications, potentially, and one skilled in the art could discover these. The explication of the features of this invention does not limit the claims of this application; other applications developed by those skilled in the art will be included in this invention.

What is claimed is:

1. An elongated connector for anchoring a spring-loaded attachment end of an e-track strap to a planar surface, the connector comprising:
   two opposing tang members having mounting holes extending through the tang members for mounting the connector to the planar surface;
   a central raised portion longitudinally positioned between the tang members, the central raised portion having a planar top portion with two opposing generally semi-circular ends, two downwardly extending end walls that follow the contour of the generally semi-circular ends and two opposing downwardly extending side walls that converge with the downwardly extending end walls, where the two opposing tang members extend away from the central raised portion in opposing directions from the bottom of the two opposing end walls and where the two opposing tang members lie in a common plane with one another to allow the tang members to be mounted flush against the planar surface, the central raised portion creating a hollow cavity for receiving the attachment end of the e-track strap;
   the top portion of the central raised portion including a central receiver slot having finished edges and sized to receive the spring loaded attachment end of the e-track strap within the hollow cavity within the central raised portion;
   the connector is constructed from a single piece of material, where by the two opposing end walls and two opposing side walls form a continuous, one-piece structure elevating the top portion of the central raised portion above the tang members and where bottom edges of the two opposing downwardly extending side walls terminate in the same plane as the tang member common plane to allow the connector to mount flush against the planar surface such that the connector, when mounted to the planar surface, creates a closed area below the top portion of the central raised portion to prevent access to the attachment end of the e-track strap from sides of the connector when the attachment end is positioned in the receiver slot of the connector; and where the two opposing end walls and two side walls are contoured such that the respective intersections of the two opposing end walls with the two opposing side walls are devoid of any sharp corners.

2. An elongated anchor for securing the end of an e-track connecting member to a planar surface, the anchor comprising:
   two opposing tang members for mounting the anchor to the planar surface;
   a central raised portion longitudinally positioned between the tang members, the central raised portion having a planar top portion with two opposing generally semi-circular ends, two opposing downwardly extending end walls that follow the contour of the generally semi-circular ends and two opposing downwardly extending side walls that converge at opposing ends with the downwardly extending end walls; the two opposing end walls are rounded such that their respective intersections with the two opposing side walls create a seamless graduated transition between the two end walls and two side walls and elevate the top portion of the central raised portion above the tang members;
   the two opposing tang members extend outward from the bottom of the two opposing end walls, away from the central raised portion such that the two opposing tang members lie in a common plane with one another to allow the tang members to be mounted flush against the planar surface;
   the central raised portion having a hollow cavity created within the area defined by the top portion, two opposing end walls and two opposing side walls for receiving the end of the e-track strap;
   the top portion of the central raised portion including a central receiver slot having finished edges and sized to receive the end of the e-track strap within the hollow cavity of the central raised portion;
   bottom edges of the two opposing downwardly extending side walls terminate in the same plane as the tang member common plane to allow the anchor to mount flush against the planar surface such that the anchor, when mounted to the planar surface, creates a closed area below the top portion of the central raised portion to prevent access to the end of the e-track strap from sides of the anchor when the attachment end is positioned in the receiver slot of the anchor.

3. The elongated anchor of claim 2 where the anchor is constructed from a single piece of material.

4. The elongated anchor of claim 2 where the two opposing tang members have mounting holes extending through the tang members for mounting the anchor to the planar surface.

* * * * *